United States Patent
Fontana et al.

(10) Patent No.: US 7,355,978 B2
(45) Date of Patent: Apr. 8, 2008

(54) METHOD FOR IMPLEMENTING AN OAM FUNCTION BY EXCHANGING REQUEST-REPLY PACKETS BETWEEN STATIONS OF A RPR NETWORK, AND CORRESPONDING PACKET FRAMES

(75) Inventors: Michele Fontana, Verderio Superiore (IT); Pietro Grandi, Milan (IT); Italo Busi, Cerro Maggiore (IT)

(73) Assignee: Alcatel, Paris (FR)

( * ) Notice: Subject to any disclaimer, the term of this patent is extended or adjusted under 35 U.S.C. 154(b) by 1167 days.

(21) Appl. No.: 10/208,773

(22) Filed: Aug. 1, 2002

(65) Prior Publication Data

US 2003/0048752 A1  Mar. 13, 2003

(30) Foreign Application Priority Data

Sep. 3, 2001 (IT) .......................... MI2001A1849

(51) Int. Cl.
*G01R 31/08* (2006.01)
*H04L 12/28* (2006.01)

(52) U.S. Cl. ................... 370/236.2; 370/224; 370/249; 370/252; 370/255; 370/258; 370/238; 370/404; 370/460

(58) Field of Classification Search ................ 370/217, 370/221–224, 241.1, 248–250, 252, 254, 370/255, 258, 389, 403–405, 406, 452, 460, 370/236.2, 238
See application file for complete search history.

(56) References Cited

U.S. PATENT DOCUMENTS

| | | | |
|---|---|---|---|
| 5,600,657 A | 2/1997 | Orita | |
| 6,785,285 B1* | 8/2004 | Romana et al. | 370/395.51 |
| 6,892,329 B2* | 5/2005 | Bruckman | 714/43 |
| 6,952,397 B2* | 10/2005 | Mor et al. | 370/223 |
| 7,054,264 B2* | 5/2006 | Mor | 370/223 |
| 7,061,859 B2* | 6/2006 | Barsheshet | 370/225 |
| 7,061,870 B2* | 6/2006 | Orsatti | 370/241.1 |
| 7,088,682 B1* | 8/2006 | Bangolae et al. | 370/249 |
| 7,113,485 B2* | 9/2006 | Bruckman | 370/252 |
| 2002/0144190 A1* | 10/2002 | Bruckman | 714/43 |
| 2003/0009599 A1* | 1/2003 | Lee et al. | 709/251 |
| 2003/0012129 A1* | 1/2003 | Lee et al. | 370/216 |
| 2003/0074469 A1* | 4/2003 | Busi et al. | 709/238 |
| 2003/0112829 A1* | 6/2003 | Sridhar | 370/522 |

FOREIGN PATENT DOCUMENTS

WO    WO 0155854 A1    8/2001

OTHER PUBLICATIONS

I. Busi et al, "Proposal for OAM and Layer Management", IEEE 802.17 Draft Document, Sep. 10, 2001, XP002225032.

(Continued)

*Primary Examiner*—Chi Pham
*Assistant Examiner*—Ahmed Elallam
(74) *Attorney, Agent, or Firm*—Sughrue Mion, PLLC

(57) ABSTRACT

Described is a method extending the OAM functionality in the RPR networks through a new OAM loopback procedure of request-reply type together with the definition of a new RPR OAM loopback frame. The OAM loopback function allows any RPR station to check the reachability of another RPR station. It is not necessary to stop any data traffic communication on the network in order to perform this function.

14 Claims, 2 Drawing Sheets

OTHER PUBLICATIONS

N. Cole, et al.: "Resilient Packet Rings for Metro Networks", Global Optical Communication, pp. 142-146.

Proposed Draft Standard for Information Technology- Telecommunication and information exchange between systems—Local and Metropolitan Area Networks- "Part 17: Resilient Packet Ring Access Method and Physical Layer Specifications" Submitted to IEEE 802.17 as the Proposal—Darwin, Jan. 14, 2002, pp. 1-198.

* cited by examiner

| 1 Byte | Type-dependent length | 2 Bytes |
|---|---|---|
| OAM Type | Specific Fields | Checksum |

Fig. 3

| 1 Byte | 1 Byte | 2 Bytes | 2 Bytes | 2 Bytes |
|---|---|---|---|---|
| OAM Type | Request Type | Identifier | Sequence Number | Checksum |

Fig. 4

| 1 Byte | 1 Byte | 2 Bytes | 2 Bytes | 2 Bytes |
|---|---|---|---|---|
| OAM Type | Reserved | Identifier | Sequence Number | Checksum |

Fig. 5

METHOD FOR IMPLEMENTING AN OAM FUNCTION BY EXCHANGING REQUEST-REPLY PACKETS BETWEEN STATIONS OF A RPR NETWORK, AND CORRESPONDING PACKET FRAMES

INCORPORATION BY REFERENCE OF PRIORITY DOCUMENT

This application is based on, and claims the benefit of, Italian Patent Application No. MI2001A001849 filed on Sep. 3, 2001, which is incorporated by reference herein.

BACKGROUND OF THE INVENTION

1. Field of the Invention

The present invention relates to the field of RPR (Resilient Packet Ring) type networks, and more precisely to a method for implementing an OAM (Operation, Administration and Maintenance) function through the exchange of request-reply packets between the stations of a RPR network, and the relevant packet frames.

2. Description of the Prior Art

Through the IEEE Standardization Institute, a new technology according to the Standard IEEE 802.17 RPR (Resilient Packet Ring) is being standardized, which technology is ndesigned to optimize the use of available bandwidth for transporting packets in ring networks, hereunder called RPR networks, in particular in the context of MAN (Metropolitan Area Networks) networks, e.g. generally described in the article "Resilient Packet Rings for Metro Networks", Global Optical Communication, Pag. 142-146, authors N. Cole, J. Hawkins, M. Green, R. Sharma, K. Vasani, available for public on the Internet site http://www.rpralliance.org/.

The ring technology can be based for example either on SDH, Sonet or Ethernet transport physical layers, wherein the RPR networks packets are physically transported.

As illustrated in FIG. 1, a known RPR network is based on a dual counter-rotating rings configuration, respectively identified as inner ring and outer ring. Both the rings are used to carry data and/or control frames of RPR packets between a series of RPR stations. A RPR packet is meant as a layer-2 frame of the known ISO-OSI or TCP-IP stack. The RPR control frames packets are fit for developing the so-called RPR functions of "topology discovery", "protection switching" and "bandwidth management".

The "topology discovery" function is based on a mechanism which is used by RPR in order to allow every station on the ring dicovering and localizing all the other stations and their distances. When a RPR station inserts a new RPR frame packet on the ring, it selects the inner or outer ring in order to follow the shortest path towards the RPR destination station, in terms of number of RPR stations to be passed through, according to the network topology.

The "protection switching" function allows to ensure the so-called "resiliency", namely the protection capacity at RPR packet level, by taking actions within a determined time (50 ms) from the fail detection. In case of failure in the RPR network, the RPR packets controlling the "protection switching" function are used to implement an APS type protocol (Automatic Protection Switching). Both the protection mechanisms of "wrapping protection", basically similar to the traditional SDH MS-SPring system but applied in the RPR level) and "steering protection", basically similar to the transoceanic NPE but applied in the RPR level, can be supported.

The control RPR packets for bandwidth management in the RPR ring are used to ensure a fair access to the ring between the various RPR stations independently from their physical location in the ring.

The RPR technology allows for spatial re-use of the bandwith by supporting the "destination stripping" function: that is a unicast RPR packet is removed from the ring by the RPR destination station, without the need to travel in the whole ring, thus the remainder path will be available for re-use. On the contrary, the multicast or broadcast or unicast RPR packets, whose RPR destination station is not on the ring, can be subjected to the "source stripping", that is they are removed by the same RPR source station after having passed through the entire ring. A so-called "time to live" procedure, namely a time lapsing procedure, is also used to ensure that the frames do not circulate forever.

Even if RPR has not yet been fully detailed in the Standard activities, the RPR frame format comprises a header section and a payload section. The payload section contains the upper layer information to be carried. The header, on the contrary, contains at least the following fields:
  ID address of RPR destination station;
  ID address of RPR source station;
  protocol type, in order to identify the upper layer information carried in the payload;
  "time to live" TTL, in order to avoid that RPR packets circulate forever;
  Ringlet ID, in order to indicate the outer or inner ringlet path over which the frame has been inserted;
  CoS, in order to identify the class of service for the RPR frame, that is its priority;
  frame type, in order to distinguish between user data RPR frames, RPR control frames or other RPR specific frames.

In the RPR field, there is the need of introducing additional functions such as OAM (Operation, Administration and Maintenance).

As the RPR transport technology is "connectionless" (that is the sending of RPR packets does not require a connection at RPR level), it is not possible to use in RPR the already known OAM procedures, already known in the SDH or Sonet fields, which are based on the information exchange at connection level.

In the "connectionless" field, the so-called "Ping" mechanism, used in the IP (Internet Protocol) networks, is already known. The Ping mechanism, on the contrary, shows the problem that the reachability between two IP stations is checked only according to the standard communication path between the two stations already chosen by the network.

SUMMARY OF THE INVENTION

Therefore, the present invention has the object of eliminating all the above said troubles and of indicating a method for extending the OAM functionality in the RPR networks through a new OAM loopback frame of request-reply type together with the definition of a new type of RPR OAM loopback packet. This packet can be used by each RPR station to check the reachability of another RPR destination station.

The OAM loopback function allows to each RPR station to check the reachability of another RPR station. It is not necessary to stop any data traffic communication on the network, in order to perform this function.

This function is implemented, for instance upon request of a management system, by inserting an OAM loopback RPR request packet in the nertwork ring at one station, the RPR source station, and sending said RPR packet to another station, called the RPR destination station. The destination station, as a consequence, will send an OAM loopback RPR reply message to the RPR source station. The ring paths for sending both the requests and the replies can be established according to information available through the RPR packets themselves.

A further object of the present invention is to define the formats of the OAM loopback RPR packets both for requests and replies.

In order to achieve these objects, the present invention provides a method for implementing an OAM function through the exchange of request-reply packets between the RPR network stations and the corresponding packets, as well as a RPR network comprising said OAM function, as better described in the claims, which are an integral part of the present description.

Further objects and advantages of the present invention will become clear from the following detailed description of an embodiment thereof, and by the annexed drawings, given by way of a non-limiting example.

BRIEF DESCRIPTION OF THE DRAWINGS

In the drawings:

FIGS. 3, 4 and 5 illustrate, according to the present invention, the formats of OAM loopback packets of generic, request and reply type, respectively.

BEST MODE FOR CARRYING OUT THE INVENTION

Hereinafter, there is the description of the OAM loopback function according to the present invention.

A RPR management system is usually present, for example implemented through a known operator interface such as MIB (Management Information Base) or CLI (Command Line Interface). Said management system can require any RPR station, for instance the A station in FIG. 2, to check the reachability of any other RPR station, for instance the B station in FIG. 2, through the RPR network.

The RPR management system can specify how the RPR OAM loopback request packet should be sent: through the shortest network path (according to the ring topology information obtained through the Topology Discovery search); on the outer ringlet; on the inner ringlet.

Figure 1:
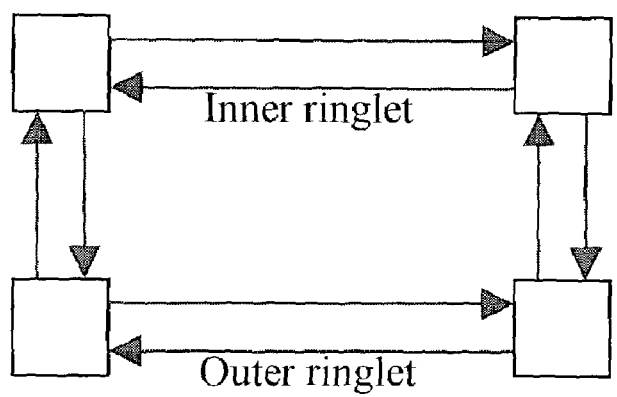
FIG. 1 illustrates the structure of a traditional RPR network as above described.
Figure 2:
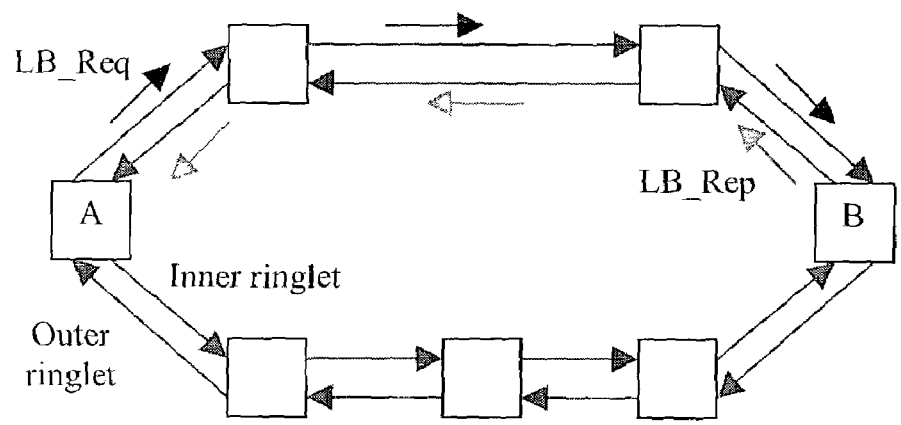
FIG. 2 illustrates the structure of a RPR network, to which the OAM loopback function according to the present invention is applied.

By default, if nothing is specified, the loopback request is sent on the shortest path. In the example of FIG. 2, the shortest parth for the loopback request from A to B is through the outer ring, as a reduced number of stations is passed through (two stations instead of three on the opposite direction).

The management system can also specify which CoS value should be used both in the RPR OAM loopback request packet and in the reply packet. By default, the highest priority CoS will be used.

The management system can specify how the RPR destination station has to reply: either on the shortest path or on the same path where the request was received or on the opposite path or on the inner or outer ringlet. By default, the RPR destination station is required to reply on the shortest path. In the example of FIG. 2, the shortest path for the reply (from B to A) is through the inner ringlet, as a reduced number of stations is passed through (two stations instead of three on the opposite direction).

After the management system has initiated a RPR OAM loopback procedure, the RPR source station (A in FIG. 2) generates a RPR OAM loopback request packet addressed to the destination station (station B in FIG. 2).

The choice of the paths is done according to what has been required by the management system. The RPR OAM loopback request shall contain an indication for the destination station about how it has to reply, as hereunder specified.

When the RPR destination station receives the loopback request RPR OAM, it generates the RPR OAM loopback reply packet and sends it back to the source RPR station. The reply is sent on the path chosen in the loopback request packet.

When the source RPR station receives the reply packet, it notifies the management system of the success of the procedure through the above said operator interface. If the reply is not received within a pre-defined time interval (either because the request can not reach the destination station or because the reply can not come back to the source station) the OAM loopback procedure is declared failed and the management system is notified about this failure.

Hereunder, there is the description of the generic format of a OAM loopback packet according to the present invention.

An OAM loopback packet is identified by a particular value of the "Frame Type" field in the RPR header. The payload of the OAM loopback packet, with reference to FIG. 3, is structured as in following fields:

OAM Type: Specifies which type of this OAM message is. The list of the messages codes is as follows:

TABLE 1

| OAM Type | Description |
| --- | --- |
| 0x00 (Hex) | Loopback request |
| 0x01 | Loopback reply |
| All the others | Reserved for further OAM functions |

Specific fields: the length and structure of this part depends on the OAM message type; the format of this structure is defined with the relevant OAM message type.

Checksum: The last 16 bits of frame payload contain the CRC checksum code (CRC-16) calculated on the whole OAM message payload, starting from the OAM type and ending at the last specific field (if present). When an OAM frame is received with a bad checksum, it is discarded.

Hereunder, there is the description of the format of the OAM loopback request packet according to the present invention.

The format of the OAM loopback request packet is shown in FIG. 4. The following fields are defined:

OAM Type: Represents an OAM loopback request type. See table 1, above.

Request type: It is used to ask the RPR destination station how to respond and which path has to be used. The list of request types is as follows:

TABLE 2

| Request type | Description |
| --- | --- |
| 0x00 (Hex) | The destination station replies on the shortest path |
| 0x01 | The destination station replies on the inner ring |
| 0x02 | The destination station replies on the outer ring |
| 0x03 | The destination station replies on the same ring wherein it has received the request |
| 0x04 | The destination station replies on the opposite ring wherein it has received the request |
| All the others | Reserved for further OAM functions |

Identifier and Sequence Number: they are used by the application to correlate the requests with the replies, for instance in the case of multiple co-existing requests and relating to the same stations.

In the header:

the destination address is filled with the value provided by the management system, representing the RPR destination station to be monitored;

the CoS field is filled with the value requested by the management system;

the Ringlet ID field is filled with the value requested by the management system, representing the path over which the loopback OAM frame is sent.

Hereunder, there is the description of the format of the loopback reply OAM message according to the present invention.

The payload format of the loopback reply OAM frame is structured as in FIG. 5. The following fields are defined:

OAM type: Represents the type of OAM loopback reply;

Reserved: This field is not used. It must be fixed to 0x00 in transmission and must be ignored in reception; it is introduced just for complying with the request packet;

Identifier and Sequence Number: they are copied from the request message and used by the application in order to correlate the requests and the replies.

In the header:

the destination address is copied from the request's source address;

the CoS field is copied from the OAM loopback request packet;

the Ringlet ID field represents the path over which the loopback reply OAM packet is sent. The decision about the path is chosen according to the information in the Request Type field of the OAM loopback request message.

From the above description, the field technician is able, without giving further explanations, to obtain all the necessary information to implement the method extending the OAM functionality in the RPR networks through the OAM loopback procedure, of request-reply type, according to the present invention and also to generate the RPR OAM loopback request-reply packets and to circulate them in the network, by utilizing the standard know-how of the already known RPR technology.

We claim:

1. A method for implementing an Operation, Administration and Maintenance (OAM) function in a telecommunication Resilient Packet Ring (RPR) network of a packet type network, wherein a plurality of RPR stations are ring connected through dual counter-rotating data flow ringlets, the ringlets comprising an outer ringlet and an inner ringlet, further wherein said OAM function is implemented through a loopback OAM procedure of a request-reply type comprising:

at a RPR source station, inserting a RPR OAM loopback request packet in the RPR network;

sending said RPR OAM loopback request packet to a RPR destination station, for checking reachability of the RPR destination station;

at the RPR destination station, sending a RPR OAM loopback reply packet to the RPR source station upon receipt of said RPR OAM loopback request packet, wherein a ringlet path for sending said RPR OAM loopback reply packet is determined according to information available through the RPR OAM loopback request packet.

2. A method according to claim 1, wherein sending said RPR OAM loopback request packet comprises sending the RPR OAM loopback request packet either on a shortest path, in terms of number of intermediate stations between said source and destination stations, and on one of a specified outer ringlet and a specified inner ringlet.

3. A method according to claim 2, further comprising determining the ringlet path for sending the request packet according to a request of a management system.

4. A method according to claim 1, wherein sending said RPR OAM loopback reply packet comprises sending the RPR OAM loopback reply packet either on one of a shortest path, in terms of number of intermediate stations between said source and destination stations, on a specified outer ringlet, on a specified inner ringlet, on a same ringlet over which the request packet is sent, and on an opposite ringlet over which the request packet is sent.

5. A method according to claim 4, further comprising determining the ringlet path for sending the reply packet according to a request of a management system.

6. A method according to claim 1, further comprising by the RPR source station, notifying a management system regarding receipt of said OAM loopback reply packet and if said OAM loopback reply packet is not received within a predefined time interval, notifying the management system about a failure of the OAM loopback packet.

7. A method according to claim 1, wherein the inserting the RPR OAM loopback request packet in the RPR network comprises inserting a RPR OAM loopback request packet comprising the following fields:

a) in a payload of the RPR OAM loopback request packet:

an OAM type field representing a type of OAM loopback request message;

a request type field for asking the RPR destination station which path should be used for reply; and an identifier and sequence number field correlating requests with replies, if there are co-existing multiple requests relating to a same station, and b) in a header of the RPR OAM loopback request packet:

a destination address field comprising an address of the RPR station to be monitored;

a class of service value field indicating a priority level of the request; and a path identifier field identifying a path over which the OAM loopback request packet is sent.

8. A method according to claim 7, wherein said request type field can assume one of the following meanings:

the destination station replies on a shortest path;

the destination station replies on an inner ringlet;

the destination station replies on an outer ringlet;

the destination station replies on a same ringlet over which the destination packet has received the request; and the destination station replies on an opposite ringlet over which the destination packet has received the request.

9. A method according to claim 7, wherein said RPR OAM request loopback packet further comprises a checksum field comprising a checksum cyclic redundancy check (CRC) code which is calculated on an entire OAM payload.

10. A method according to claim 1, wherein sending the RPR OAM loopback reply packet comprises sending a RPR OAM loopback reply packet comprising the following fields:
   a) in a payload of the RPR OAM loopback reply packet:
   a OAM type field representing a type of OAM loopback reply message;
   an identifier and sequence number field which is copied by the RPR OAM loopback request packet to correlate requests with replies;
   b) in a header of the RPR OAM loopback reply packet:
   a destination address field which is copied from an address in said RPR OAM loopback request packet;
   a class of service field which is copied from the RPR OAM request packet; and
   a path identifier field which identifies a path over which the reply packet is sent; wherein the value of the path identifier field is contained in a field of OAM loopback request packet.

11. A method according to claim 10, wherein said RPR OAM reply loopback packet further comprises a checksum field comprising a checksum cyclic redundancy check (CRC) code which is calculated on an entire OAM payload.

12. A method according to claim 1, wherein the RPR OAM loopback request packet further includes information indicating a ringlet path over which the RPR OAM loopback request packet is sent.

13. A method according to claim 1, wherein the RPR OAM loopback reply packet includes information indicating the ringlet path over which the RPR OAM loopback reply packet is sent.

14. A Resilient Packet Ring telecommunications (RPR) network comprising a packet type network wherein a plurality of RPR stations are ring connected through dual counter-rotating data flow ringlets, the ringlets comprising an outer ringlet and an inner ringlet, further wherein the RPR network comprises means for implementing an Operation, Administration and Maintenance (OAM) function through a loopback OAM procedure of a request-reply type, said means for implementing the OAM function comprising:
   at a RPR source station, means for inserting a RPR OAM loopback request packet in the RPR network;
   means for sending said RPR OAM loopback request packet to a RPR destination station, for checking reachability of the RPR destination station;
   at the RPR destination station, means for sending a RPR OAM loopback reply packet to the RPR source station upon receipt of said RPR OAM loopback request packet, wherein a ringlet path for sending said RPR OAM loopback reply packet is determined according to information available through the RPR OAM loopback request packet.

* * * * *